(12) United States Patent  
Winzinger

(10) Patent No.: US 8,939,749 B2
(45) Date of Patent: Jan. 27, 2015

(54) BLOW-MOLDING MACHINE FOR PLASTIC CONTAINERS

(75) Inventor: Frank Winzinger, Freising (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/232,367

(22) PCT Filed: May 14, 2012

(86) PCT No.: PCT/EP2012/058898
§ 371 (c)(1),
(2), (4) Date: Jan. 30, 2014

(87) PCT Pub. No.: WO2013/007421
PCT Pub. Date: Jan. 17, 2013

(65) Prior Publication Data
US 2014/0161920 A1  Jun. 12, 2014

(30) Foreign Application Priority Data
Jul. 13, 2011  (DE) .......................... 10 2011 079 077

(51) Int. Cl.
*B29C 49/30* (2006.01)
*B29C 49/32* (2006.01)
(Continued)

(52) U.S. Cl.
CPC ................. *B29C 49/56* (2013.01); *B29C 49/32* (2013.01); *B29C 49/48* (2013.01); *B29C 49/12* (2013.01); *B29C 49/421* (2013.01); *B29C 49/4236* (2013.01); *B29C 2049/4869* (2013.01)
USPC ........... 425/183; 425/234; 425/522; 425/534; 425/538; 425/539; 425/540; 425/541

(58) Field of Classification Search
USPC ............. 425/3, 183, 234, 453, 522, 534, 538, 425/539, 540, 541
See application file for complete search history.

(56) References Cited

U.S. PATENT DOCUMENTS 3,391,656 A * 7/1968 Schafer ......................... 425/116
3,415,916 A   12/1968 Valyi
(Continued)

FOREIGN PATENT DOCUMENTS

DE        2062283 A1    8/1971
DE   000002215494 B2    1/1976
(Continued)

OTHER PUBLICATIONS

International Search Report for PCT/EP2012/059109, dated Nov. 20, 2012.
(Continued)

*Primary Examiner* — Robert B Davis
(74) *Attorney, Agent, or Firm* — Marshall, Gerstein & Borun LLP

(57) ABSTRACT

What is described is a blow-molding machine for plastic containers, comprising a plurality of platens for supporting blow mold halves, wherein at least two of the platens are in the form of movable multi-carriers for simultaneously supporting at least two blow mold halves which are assigned to different blow-molding cavities. Since the multi-carriers are driven in such a manner that at least one of the blow-molding cavities can be opened and at the same time at least one other of the blow-molding cavities can be closed by means of a continuous movement of the multi-carriers, acceleration and deceleration ramps can be reduced upon opening and closing and it is possible to gain process time for the blow molding.

16 Claims, 19 Drawing Sheets

(51) Int. Cl.
*B29C 49/34* (2006.01)
*B29C 49/56* (2006.01)
*B29C 49/48* (2006.01)
*B29C 49/12* (2006.01)
*B29C 49/42* (2006.01)

(56) References Cited

U.S. PATENT DOCUMENTS

| | | | |
|---|---|---|---|
| 3,430,292 A * | 3/1969 | Bauman et al. | 425/183 |
| 3,626,589 A * | 12/1971 | Hansen | 425/537 |
| 4,005,966 A | 2/1977 | Nutting | |
| 4,165,960 A * | 8/1979 | Lemelson | 425/453 |
| 4,365,950 A * | 12/1982 | Harry et al. | 425/534 |
| 4,768,942 A * | 9/1988 | Sola | 425/233 |
| 5,975,881 A | 11/1999 | Langos et al. | |
| 6,220,310 B1 | 4/2001 | Emmer | |
| 6,488,884 B1 * | 12/2002 | Daubenbuchel et al. | 425/541 |
| 7,081,222 B2 * | 7/2006 | Gram | 264/234 |

FOREIGN PATENT DOCUMENTS

| | | |
|---|---|---|
| DE | 3133341 A1 | 3/1983 |
| DE | 3732881 C2 | 11/1989 |
| DE | 3832566 A1 | 4/1990 |
| DE | 19912116 A1 | 9/2000 |
| DE | 19948474 A1 | 4/2001 |
| DE | 20007429 U1 | 5/2001 |
| DE | 10065591 A1 | 9/2002 |
| DE | 10325693 A1 | 7/2004 |
| DE | 102005008685 A1 | 9/2006 |
| DE | 102006023531 A1 | 11/2007 |
| DE | 102008038781 A1 | 2/2010 |
| DE | 102009006508 A1 | 7/2010 |
| DE | 60208936 T3 | 10/2010 |
| DE | 102009020738 A1 | 11/2010 |
| DE | 102009021792 A1 | 11/2010 |
| EP | 1060865 A2 | 12/2000 |
| EP | 1535719 A1 | 6/2005 |
| EP | 1226017 B1 | 3/2006 |
| EP | 2008793 A1 | 12/2008 |
| EP | 2332846 A1 | 6/2011 |
| FR | 2700293 A1 | 7/1994 |
| WO | WO-9323232 A1 | 11/1993 |
| WO | WO-9630189 A1 | 10/1996 |
| WO | WO-9851608 A1 | 11/1998 |
| WO | WO-9947330 A1 | 9/1999 |
| WO | WO-2007096042 A1 | 8/2007 |
| WO | WO-2008017485 A1 | 2/2008 |

OTHER PUBLICATIONS

International Search Report for PCT/EP2012/058898, dated Aug. 1, 2012.
Search report for DE 10 2011 079 078.0, dated Apr. 10, 2012.
Search report for DE 10 2011 079 076.4, dated Apr. 5, 2012.
Search report for DE 10 2011 079 077.2, dated Apr. 19, 2012.
Search report for EP 12 16 7302, dated Dec. 21, 2012.
Search report for EP 12 16 7302, dated Feb. 25, 2014.

* cited by examiner

BLOW-MOLDING MACHINE FOR PLASTIC CONTAINERS

CROSS-REFERENCE TO RELATED APPLICATION

The present application is the United States national phase of International Patent Application No. PCT/EP2012/058898, filed May 14, 2012, which application claims priority of German Application No. 102011079077.2, filed Jul. 13, 2011. The priority application, DE 102011079077.2, is incorporated herein by reference.

FIELD OF THE DISCLOSURE

The present disclosure relates generally to a blow-molding machine for plastic containers, and more specifically, to a blow-holding machine with a plurality of mold carries for blow mold halves, at least two of the mold carriers being movable multicarriers for simultaneously carrying at least two blow mold halves that are associated with different blow mold cavities.

BACKGROUND

Several blow-molding stations with blow molds are known to be provided on blow-molding machines for plastic containers, where the blow molds comprise at least two blow mold halves that are opened for inserting a preform and for removing the fully blow-molded container and are closed for blow-molding the container. Two blow mold halves are commonly provided that have a parting plane passing through the main axis of the container to be blow-molded and that can be opened and closed using a swivel mechanism. The blow mold halves associated with a blow mold cavity are mounted on a common mold carrier and must first be accelerated for opening and again decelerated prior to reaching the open position. Similarly, the blow mold halves have to again be accelerated for closing and again decelerated prior to reaching the closed position.

Process time is consumed for the associated acceleration and deceleration ramps, i.e. for the duration of the acceleration and deceleration phases, and comparatively complex drive control is required for the blow mold halves.

EP 1 226 017 B1 proposes an improved blow-molding machine, but radially movable holding arms for the mold carriers are proposed for increasing capacity, the implementation and motion coordination of which is complex.

SUMMARY OF THE DISCLOSURE

The object of the present disclosure is to provide a blow-molding machine in which less process time is consumed for opening and closing the blow mold cavities and in which the drive for the blow mold halves can be simplified.

This object is satisfied with a blow-molding machine in which the multi-carriers are driven such that at least one of the blow mold cavities can be opened with a continuous motion of the multi-carrier and simultaneously at least one other of the blow mold cavities can be closed. As a result the multi-carriers can be continuously moved relative to the other mold carriers and/or a common machine body, for example, between two end positions in which other blow mold cavities are respectively opened and closed. A continuous motion phase therebetween allows simultaneous opening and closing with the least possible number of acceleration and deceleration ramps. It therefore enables realizing combined motion sequences for closing and opening several blow mold cavities with minimal input of energy and time. Suitable drives can be realized with, for example, servo motors and/or cam controls. It is crucial to have a continuous relative motion between the mold carriers in which an interruption during loading of the preforms and removal of the blow-molded containers, such as bottles, is avoided.

During the continuous motion, accelerations and decelerations of the mold carrier can occur. In particular, the derivative of the function of the distance traveled over time during the motion of the mold carrier from opening a cavity to closing another cavity always has the same sign, with the exception of the two end positions in which the derivative of the function equals zero. The reference system for this is either the machine frame or, if the mold carriers are arranged on a rotating blowing wheel, the blowing wheel.

In a favorable embodiment, at least one mold carrier is mounted linearly displaceable to simultaneously close a first set of blow mold cavities and to open a second set of blow mold cavities. Stationary blow-molding machines with particularly efficient use of process time can thereby be realized. For example, the mold carriers can be arranged linearly in a row to move every second mold carrier respectively in the same direction towards an adjacent mold carrier and away from the other adjacent mold carrier.

The mold carriers are preferably rotatably mounted so as to simultaneously close a first set of blow mold cavities and to open a second set of blow mold cavities. The continuous opening and closing of blow mold cavities by rotating or pivoting the mold carriers can be implemented in a particularly simple manner in terms of design-engineering. The first and second set of blow mold cavities can be composed of any number of blow mold cavities. It is also possible that only a single blow mold cavity is respectively opened and only a single further blow mold cavity is closed at the same time.

In a particularly advantageous embodiment, the mold carriers are designed as double carriers for carrying two blow mold halves facing away from each other. In this manner, a combined and continuous motion for opening a blow mold cavity and for closing at least one further blow mold cavity can be performed in a particularly simple manner. By moving the double carrier in the direction of a further mold carrier, a blow mold cavity between said mold carrier and the double carrier can be closed. At the same time, a blow mold cavity between the second blow mold half of the double carrier and a further mold carrier be opened.

Preferably, at least one of the mold carriers of the blow-molding machine is stationary. This allows for the reduction of mechanical complexity for opening and closing the blow mold cavity. Stationary is presently understood to mean a stationary arrangement relative to a machine base or frame. Actively operated components, such as valves, motors, and the like can thereby be arranged in a particularly simple manner in the region of the stationary mold carrier.

A blowing nozzle is preferably provided at the stationary mold carrier for sealing the container, such as a bottle, from the environment and/or a stretching rod for stretching the preforms in their longitudinal axis and/or a pressure pad for pressing together the blow molds against each other or to compensate for the outwardly acting blowing pressure within the container, respectively. This makes it possible to realize a particularly robust and reliable blow-molding machine. At the same time, the supply of compressed air is simplified.

The cavities between two mold carriers can be stationary during the insertion of the preforms to ensure accurate transfers and receptions of preforms or containers, but they can also be moved during the transfer processes to ensure use of the blow-molding machine to capacity.

Insertion of the preforms into the cavity can in particular occur in the direction of the longitudinal axis of the blow mold. Thereby, the closing cavity does not need to wait for a lateral insertion, past the blow mold halves. Consequently, the feed system is less dependent on the state of the mold carrier system, which can increase the productivity of the blow-molding machine. Insertion into an already circumferentially closed cavity is therefore also possible.

In a particularly advantageous embodiment, at least two of the mold carriers can be moved into a blowing position in which they together close the blow mold cavity. A continuous motion for opening and/or closing further blow mold cavities provided at the blow-molding machine can thus be performed. Process time of the blowing machine can thereby be used particularly efficiently.

Preferably, at least two multi-carriers are provided which are independently movable. This allows continuous motion sequences for opening and closing blow molds and for blow-molding the individual containers to be realized in a particularly diverse manner.

Preferably, the multi-carriers are mounted on individually driven vehicles that are driven, in particular using magnetic force coupling. Different linear or curved motion sequences when opening, closing and blowing the individual containers can thereby be combined. A magnetic force coupling is particularly suitable for transport systems in which active drive components are provided in rails or the like, and in which the vehicles are equipped with reactive, particularly passive drive components, such as permanent magnets. This enables realizing flexible and modular drive systems.

Preferably at least two multi-carriers are provided being firmly coupled together and jointly driven. The number of necessary drive systems can therewith be minimized in order to realize a particularly simple and cost-effective blow-molding machine in terms of design-engineering. For example, servo motors, pneumatic cylinders or linear motors are suitable drives. In particular, the at least two multi-carriers connected to each other do not together form a cavity, but with respective other mold carriers.

The blow-molding machine can also be operated in particular in a clean room. Where this is the case, in particular the drives for the transport system or the mold carriers are located outside the clean room. Force transmission devices into the clean room are then shielded using conventional measures such as sealing bellows, rubber seals, hydraulic seals, for example, water locks or vapor barriers. Alternatively, magnetic force transmission devices can be provided that can be arranged within the clean room.

In a further advantageous embodiment, the blow mold halves are tilted by 180° relative to each other. This enables a particularly space-saving design and particularly efficient use of process time. In particular a blow mold half with the neck finish being in particular oriented vertically downwardly, and a blow mold half with the neck finish being oppositely oriented, in particular vertically upwardly, are disposed on a multi-carrier. This embodiment is of particular advantage for tapering container shapes, such as conical or pyramidal forms, but can also facilitate feeding or removing preforms or containers because more space is in this manner provided for different grippers of the transport system.

When a pressure pad is used, then it is disposed between the mold carrier and the blow mold half. In a multi-mold carrier, it is conceivable to supply all pressure pads with pressure media via one common duct. A valve for connecting the pressure can simultaneously connect the blowing pressure for all blow mold halves. But it is also possible to assign each cavity or blow mold half its own separate valve, in particular if not all blow mold halves simultaneously form a cavity in which a container is blown. In this manner, dead space to be filled with air can be saved for blow mold halves in use.

In a further advantageous embodiment, the multi-carrier is formed by at least three blow mold halves and is rotatably mounted and formed in particular as a planet gear for closing the various blow mold cavities. This allows realizing a quasi-continuous mode of operation for a stationary blow-molding machine.

A particularly advantageous embodiment of the present disclosure further comprises a locking device for locking the multi-carrier at least one adjacent mold carrier. This allows the motion for opening and closing individual blow mold cavities to be decoupled from a motion sequence for locking the multi-carrier. The locking device according to the present disclosure is in particular suited for alternately locking the multi-carrier at different adjacent mold carriers. Different blow mold cavities can thereby be realized by locking the multi-carrier at different positions.

In this, the locking device generates, in particular, a positive-fit connection between two or more mold carriers. It can be formed as a hook, for example, as described in publication EP 1 535 719 B1, as a rotating shaft, as, for example, in publication DE 20007429, or as a conically tapering or beveled, in particular V-shaped casing or clamp encompassing a plurality of mold carrier halves. The lock can be designed such that it counteracts the blowing pressure within the containers by active blockage via an elbow lever and/or an actuator, such as a pneumatic cylinder, constantly acting during the blowing process.

Preferably, the blow-molding machine further comprises a transfer device on which double grippers for gripping a preform and a blow-molded container are provided. This makes it possible to transfer both the preforms and the blow-molded container to the blow-molding machine or to remove them therefrom by using a single transfer device, such as a transfer star wheel. Preferably, the double gripper comprises two separately controllable gripper units for gripping the preforms and the blow-molded containers. The transfer motions of the preforms and the blow-molded containers can therewith be decoupled from each other. It is in particular possible to transfer a preform using one gripper unit of the double gripper into an open blow mold cavity and to remove a fully blow-molded container using the second gripper unit of the double gripper from a neighboring opened blow mold cavity. The transfer process can thereby be performed very efficiently, i.e. in a very small range of the machine angle of the blow-molding machine.

A transfer device is preferably provided having the gripper for the preforms and/or blow-molded containers mounted on individually driven vehicles. This enables a particularly flexible transfer during the continuous motion of the mold carriers.

The drives of the mold carrier system and the transfer system are in particular connected to each other via controls in order to ensure precise coordination of the motions. A control scheme is envisaged in particular in which the time for blow-molding individual containers is not only pre-determined, but controlled for each individual cavity. Sensors, such as pressure sensors and/or flow measuring devices for the blowing air can be provided which monitor completion of a container.

In general, it is possible for the blow-molding machine that the containers and/or preforms are continuously transported by the transfer and transport system. During the blowing process, the containers can be continuously transported, in particular on a rotating blowing wheel, or be located in a stationary cavity. Cyclical transportation or blowing can be advantageous in certain embodiments. Mixed forms of transport are also conceivable.

In a particularly favorable embodiment, the blow mold halves have mutually corresponding parting planes on which two blow mold halves can be guided to one another and parting planes of the same multi-carrier are arranged parallel to each other so that the associated blow mold halves face away from each other or towards each other at an angle equal to $180°*(x-2)/x$, where x denotes the number of blow mold halves per multi-carrier. This equation is true for a number of at least three blow mold halves per multi-carrier. The included angle is formed by the parting planes themselves or imaginary extension lines of the parting planes. With two blow mold halves, the parting planes face in particular away from each other.

Preferably, the blow mold halves have parting planes corresponding to each other, on each of which two blow mold halves can be guided to one another, and the blow mold halves are each arranged on the multi-carriers in an unchanged position relative to each other, where, in particular, parting planes of the same multi-carrier each include an angle unequal to zero.

On one multi-carrier, any number of blow mold halves can be provided which can form various cavities with other blow mold halves on other carriers. In this, the plane of a blow mold half in which it is united with another blow mold to form a cavity is, following the general parlance, referred to as a parting plane.

In a further advantageous embodiment, a plurality of substantially stationary mold carriers are provided in an in particular horizontal plane, where a first set and a second set thereof are spaced apart facing each other. In this, a multi-carrier can be rotatably mounted about an axis that is parallel to this plane, in particular lying in this plane. The multi-carrier is in particular arranged between the two sets of substantially stationary mold carriers and comprises at least a first set of blow molds first forming cavities with the first set of mold carriers and, following half a rotation about the axis, with the second set of mold carriers. A longitudinal axis of the stationary blow molds, being defined substantially by a center line from the neck finish portion to the base of the blow molds, is in particular likewise arranged in this plane. It would also be conceivable to arrange the neck finishes of the blow molds of the first set of substantially stationary mold carriers offset by 180° relative to the neck finishes of the blow molds of the second set of substantially stationary mold carriers. The multi-carrier in particular comprises the same number of blow molds as the sum of the first and second sets of stationary mold carriers in order to simultaneously form cavities together with all blow mold halves during each rotation. The multi-carrier and/or the stationary mold carriers are in particular additionally movable to a small degree in the plane for a final closing of the cavities. This motion can also be performed by a pressure pad.

DETAILED DESCRIPTION OF THE PREFERRED EMBODIMENTS

Figure 1:
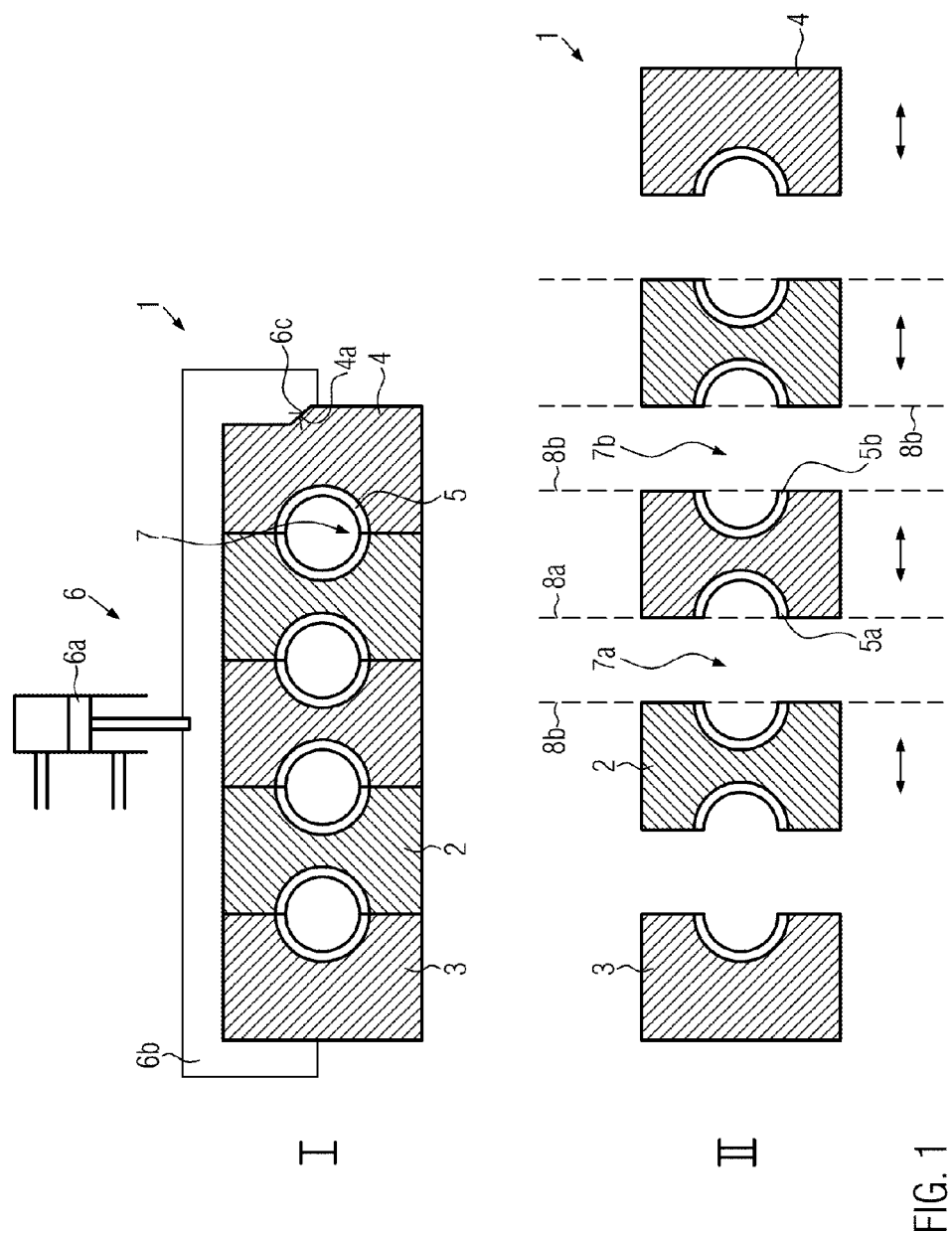
FIG. 1 shows a schematic cross-section through mold carriers of a stationary blow-molding machine according to a first embodiment.

As FIG. 1 illustrates, a first, stationary embodiment 1 of the blow-molding machine according to the present disclosure comprises a plurality of non-rotary mold carriers 2 to 4 for carrying blow mold halves 5. There is furthermore a locking device 6 provided for locking the mold carriers 2 to 4 in a closed position I in which the blow mold halves 5 include blow mold cavities 7. As FIG. 1 further illustrates, the locking device 6 can comprise a drive unit 6a and a clamp 6b that presses the mold carriers 2 to 4 onto each other. The clamp 6b is formed such that the blow mold cavities 7 are sealed according to the blowing pressure. For this purpose, for example, wedge surfaces 4a, 6c or the like can be provided, for example, on mold carriers 3, 4 located at the edges and the bracket 6b.

FIG. 1 further shows the mold carriers 2 to 4 in a spread apart position II in which the blow mold cavities 7 are each open. It is further illustrated that, for example, the mold carrier 3 located at the outer edge can be arranged in a stationary manner. As can be further seen from FIG. 1, a plurality of mold carriers 2 is designed as double carriers for simultaneously carrying two blow mold halves 5a, 5b, where the blow mold halves 5a, 5b are allocated to different blow mold cavities 7a, 7b. Accordingly, two different parting planes 8a, 8b are provided at the double carriers so that the blow mold halves 5a, 5b of a mold carrier 2 do not have a common parting plane.

In contrast to the stationary mold carrier 3, the double carrier and the mold carrier 4 located at the edge are linearly movable, as indicated in FIG. 1 by double arrows. The linear motion of the mold carriers 2, 4 can be generated, for example, by linear motors or pneumatic cylinders on a stationary machine frame (not shown). Common mechanisms such as elbow levers (not shown) can be used for force transmission However, the mold carriers 2 to 4 could also be mounted on individually driven vehicles, such as carriages and the like, as shall be described in more detail below.

Figure 2:
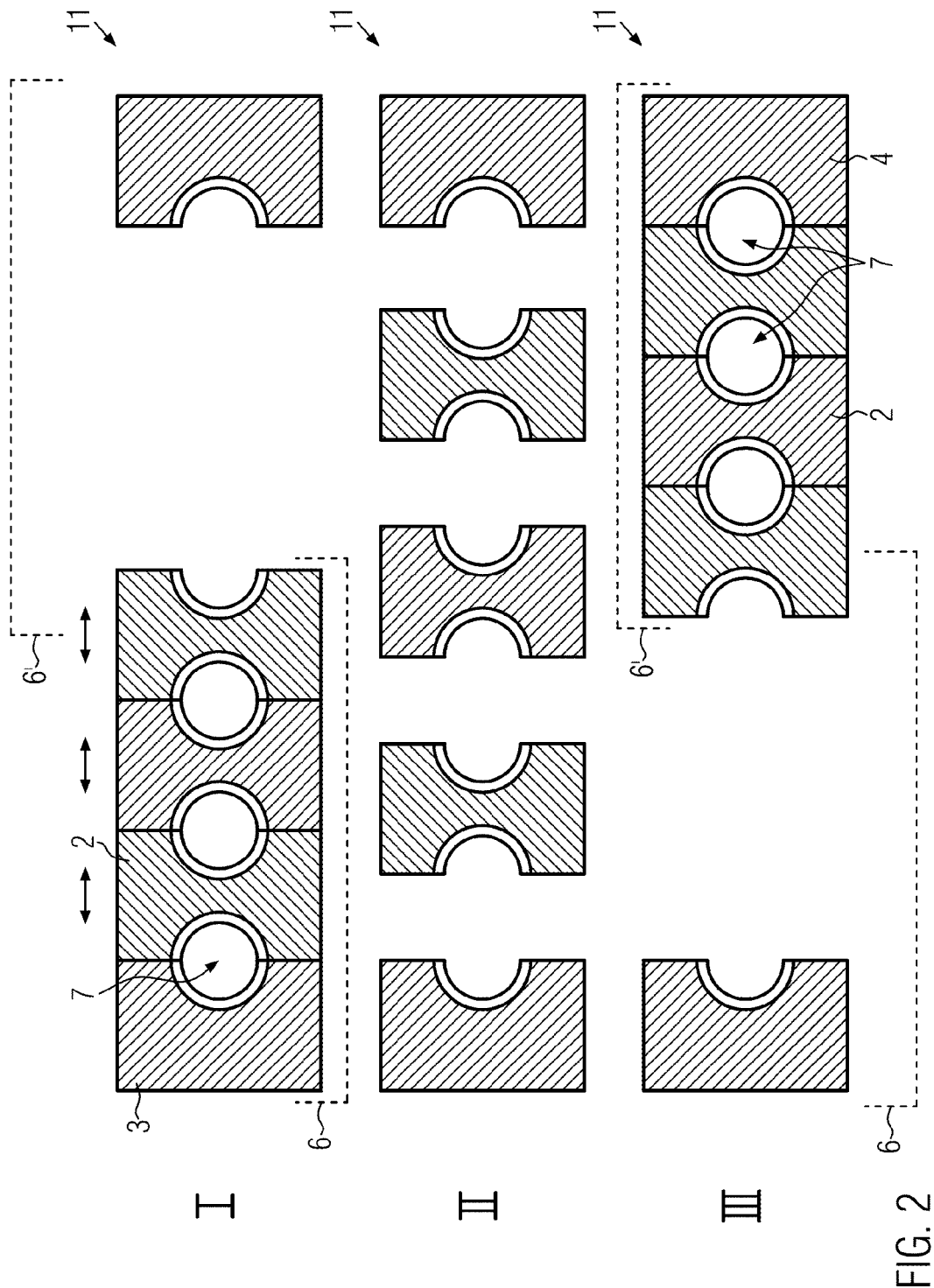
FIG. 2 shows a schematic cross-section through mold carriers of a blow-molding machine of the invention according to a second embodiment.

FIG. 2 shows a second embodiment 11 of the blow-molding machine according to the present disclosure in a schematic plan view, where the second embodiment 11 is a variant of the first embodiment 1 in which the mold carriers 2 to 4 are moved to and fro between two positions I, III for blowing containers. The mold carriers 3, 4 located at the edge are presently formed as being stationary. The mold carriers 2 are formed as double carriers and as being moveable linearly to and fro between the mold carriers 3, 4. In a first position I, the double carriers form blow mold cavities 7 with the first mold carrier 3 located at the edge. In this position, the mold carriers 2, 3 are fixed by a locking device 6—only schematically indicated—when the containers are blow-molded.

In a second position designated as III, the double carriers also form blow mold cavities 7 together with the other mold carriers 4 located at the edge. When the containers are blow-molded, the mold carriers 2, 4 are fixed by a locking device 6'—likewise only schematically indicated.

In a motion phase denoted by II, the double carriers are displaced between the mold carriers 3, 4 located at the edge. The blow mold cavities 7 formed by the mold carriers 2 to 4 are presently each open so that the preforms can be introduced into the open blow mold cavities 7. Removal of fully blow-molded containers can also occur in the phase denoted by II, in particular laterally from the gaps between the double carriers 2. Removal of the fully blow-molded containers can also occur at various intermediate positions.

Figure 3:
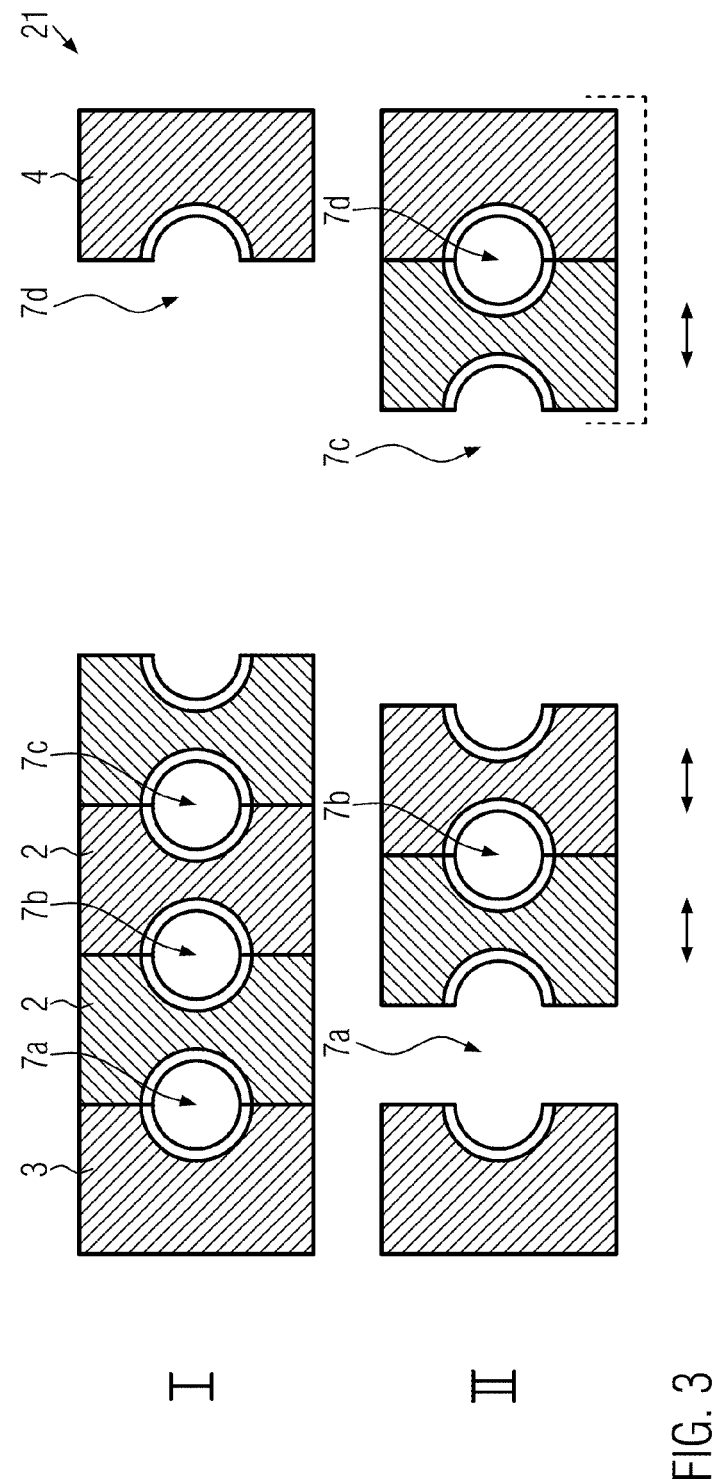
FIG. 3 shows a schematic cross-section through mold carriers of a blow-molding machine of the invention according to a third embodiment.

As is shown in FIG. 3, a third embodiment 21 is conceivable in which the at least two adjacent mold carriers 2 are jointly moved when a container is blow-molded, i.e. when the blow mold cavity is closed. This is in FIG. 3 illustrated by way of example at position II for blow mold cavity 7b. While the blow mold cavities 7a, 7c are open to introduce, for example, a preform or to remove a blow-molded container, the blow mold cavities 7b, 7d are closed, so that in each of these a respective container can be blow-molded. In contrast thereto, only the right blow mold cavity 7d at position I is open whereas the other blow mold cavities 7a to 7c are closed, so that, for example, containers can be simultaneously blown therein.

It is presently possible to flexibly move individual mold carriers 2 between multiple positions of the mold carriers 2 to 4, depending on the requirements for blow-molding individual containers. In this, blow mold cavities 7a to 7d formed between individual mold carriers 2 to 4 can be individually opened, depending on the completion of individual containers, to remove the blow-molded containers and/or to introduce preforms into the open blow mold cavities 7a to 7d.

A transfer system (presently not shown) is then preferably designed such that it can receive the fully blow-molded containers at the respective positions of the open blow mold cavity 7a to 7d when the individual cavities 7a to 7d are opened. Preforms can also be introduced at the respectively opening blow mold cavities 7a to 7d.

As it follows from the oscillating motion shown in FIGS. 2 and 3 of the mold carrier 2 designed as double carriers, a motion for closing another blow mold cavity 7a to 7d is performed automatically when opening a blow mold cavity 7a to 7d. In other words, by displacing the double carriers, a continuous motion for simultaneously closing at least one blow mold cavity 7a to 7d and opening at least one further blow mold cavity 7a to 7d is performed. It is thereby in particular not necessary to provide separate acceleration and deceleration phases for the blow mold halves 5a, 5b for opening and closing the blow mold cavities 7a to 7d. Instead, only one respective acceleration and one deceleration is required for opening and closing the blow mold cavities. Accordingly, drive energy and process time for further acceleration and deceleration ramps can be saved.

It is generally true for the blow molds shown in FIGS. 1 to 3, as for the embodiments described below, that the term blow mold halves does not imply that the blow molds must comprise only two mold parts, i.e. have only a single parting plane 8a, 8b. Instead, the mold carrier shown can be supplemented by 2 to 4 separate base molds which are driven, for example, by a separate lifting mechanism at the appropriate positions against the blow mold halves 5a, 5b shown. Blowing nozzles and/or stretching rods can also be lowered into the respective blow mold cavities 7a to 7d or moved out therefrom.

Figure 4:
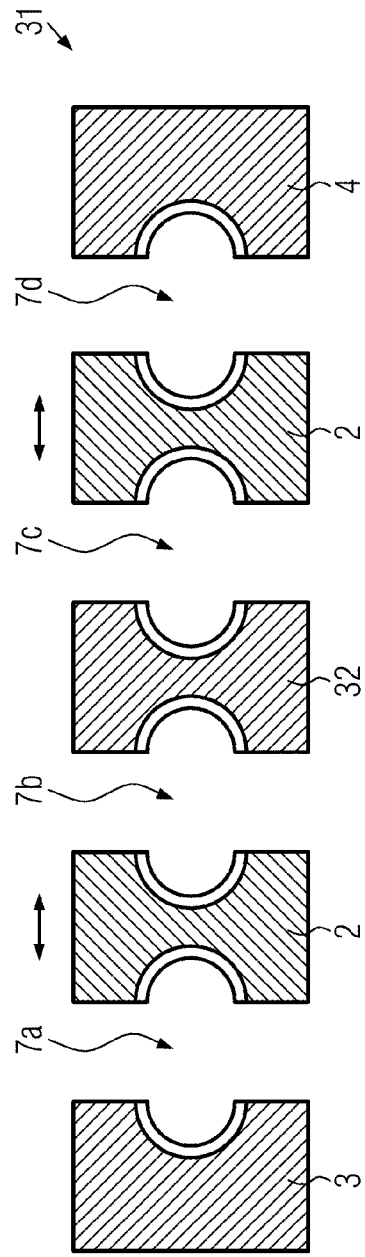
FIG. 4 shows a schematic cross-section through mold carriers of a blow-molding machine of the invention according to a fourth embodiment.

FIG. 4 shows a fourth embodiment 31 of the stationary blow-molding machine according to the present disclosure which is a variant of the third embodiment 21, in which a center mold carrier 32 is additionally formed as a stationary double carrier. In this case, the displaceable mold carrier 2 can be independently moved to and fro between the stationary mold carriers 3, 32 and 4. Also in this case, when displacing the movable mold carrier 2, a continuous motion for opening one blow mold cavity 7a and for closing a further blow mold cavity 7b can be performed simultaneously. It is thereby also in this configuration possible to reduce the process time required for decelerating and accelerating the mold carrier 2.

In addition, a first set of blow mold cavities 7a, 7b can be opened and closed independently of a second set of blow mold cavities 7c, 7d. Different containers can thereby be produced, for example, in sets of blow mold cavities. This means, the blow mold carriers 2, 3, 4, 32 can be equipped not only with different blow mold halves 5a, 5b, but blow-molding parameters can be adjusted differently for manufacturing the individual containers. Particularly high flexibility in the container production and reduction of process time can be ensured at the same time.

Figure 5:
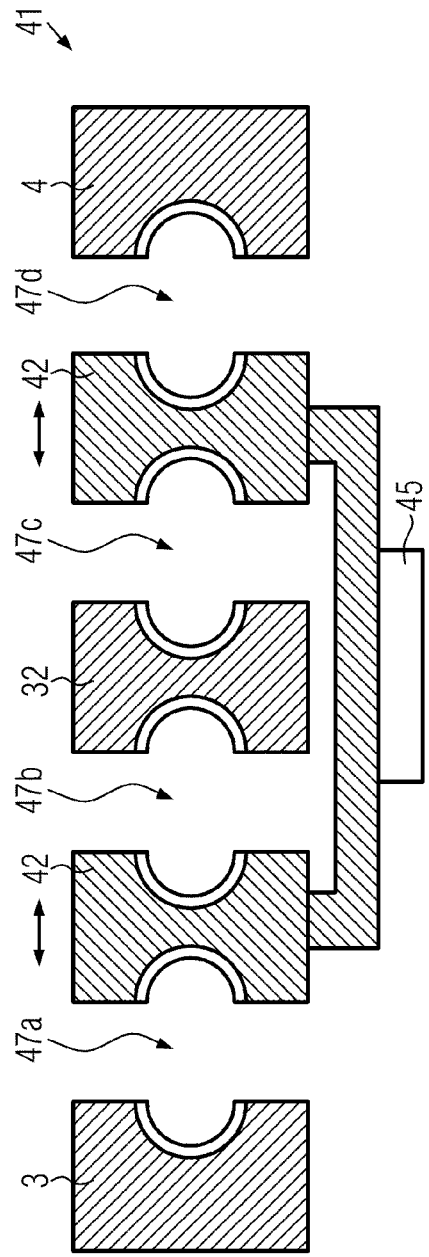
FIG. 5 shows a schematic cross-section through mold carriers of a blow-molding machine of the invention according to a fifth embodiment.

That fifth embodiment 41 of the blow-molding machine according to the present disclosure shown in FIG. 5 is a variant of the fourth embodiment 31, which differs therefrom essentially in that the movable mold carriers 42 are fixedly connected to each other and moved to and fro by a common drive 45 between the two end positions. For instance, a servo motor or a linear motor is suited as a drive unit. In this embodiment, the opening and closing times of the respective blow mold cavities 47a to 47d are coupled to each other. In return, however, a particularly cost-effective drive is possible.

Figure 6:
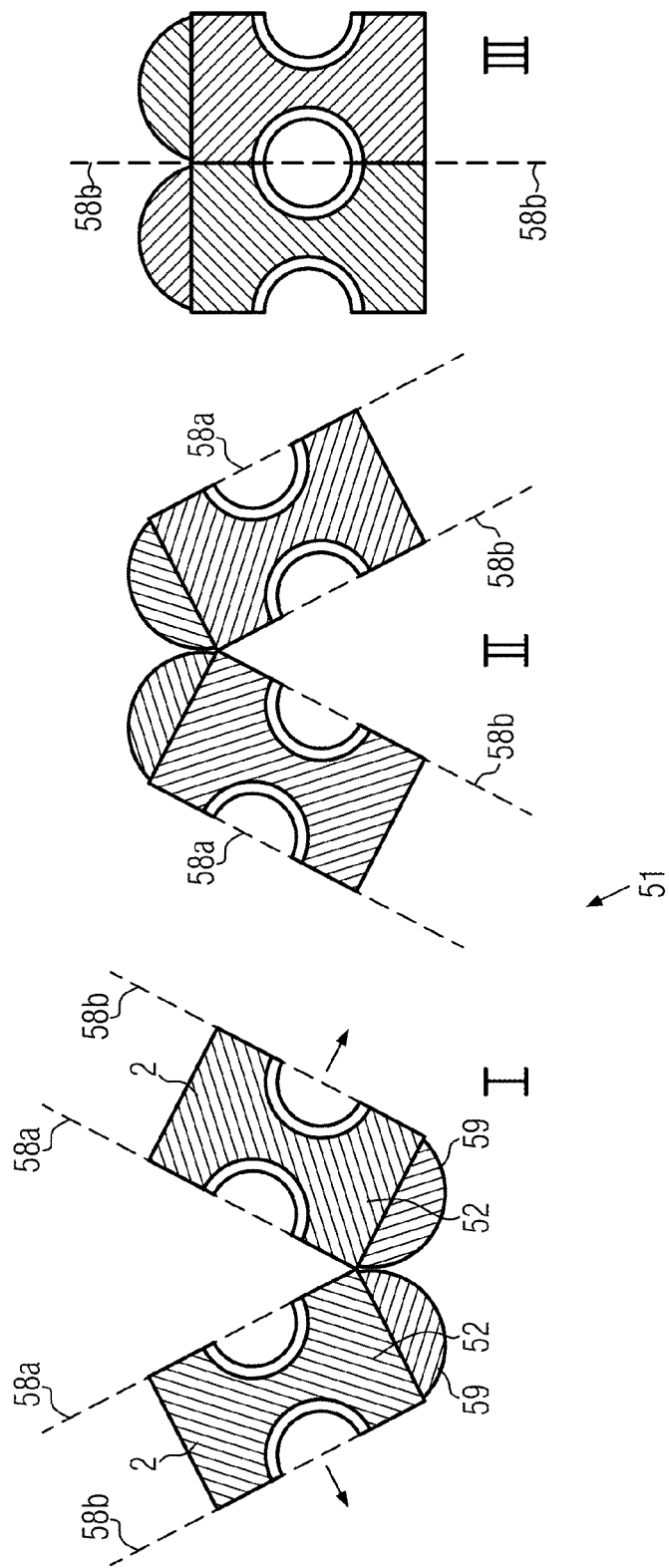
FIG. 6 shows a schematic cross-section through two mold carriers of a blow-molding machine of the invention according to a sixth embodiment.

FIG. 6 shows a sixth embodiment 51 of the blow-molding machine according to the present disclosure in which double carriers 52 are moved to and fro by 180° by a pivoting motion. In this, a first end position is provided in which the parting planes 58a of the double carriers 52 are led together and a second end position in which the oppositely oriented parting planes 58b are led together. The second end position is shown in position III in FIG. 6. Positions I and II represent intermediate positions in a continuous motion phase between the first end position and the second end position. As FIG. 6 further illustrates, the mold carriers 52 can roll onto each other in the curved portions 59. The pivoting motion of the double carrier 52 can be effected, for example, by cam tracks. Preferably a common drive is used for this. Preferably stationary blowing machines can be realized with the sixth embodiment. Here as well, acceleration and deceleration ramps can be reduced.

Figure 7:
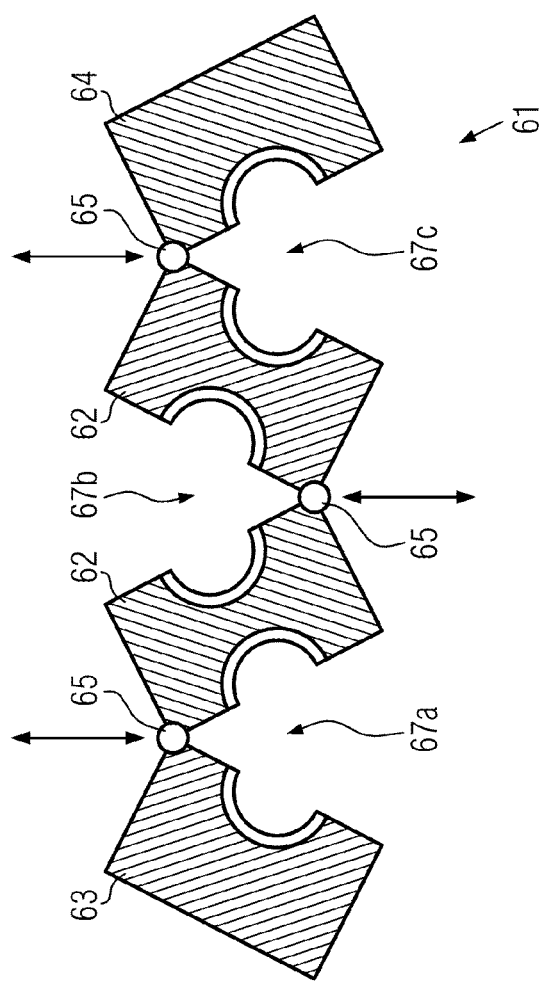
FIG. 7 shows a schematic cross-section through mold carriers of a blow-molding machine of the invention according to a seventh embodiment.

FIG. 7 shows a seventh embodiment 61 of the stationary blowing machine according to the present disclosure in which at least two double carriers 62 are provided that are coupled with each other and with mold carriers 63, 64 located at the edges by swivel axles 65. As indicated in FIG. 7 by double arrows, the swivel axles 65 can be displaced preferably linearly, whereby the blow mold cavities 67a to 67c can be continuously opened and closed. This allows an alternative drive variant of the blow-molding machine according to the invention.

Figure 8:
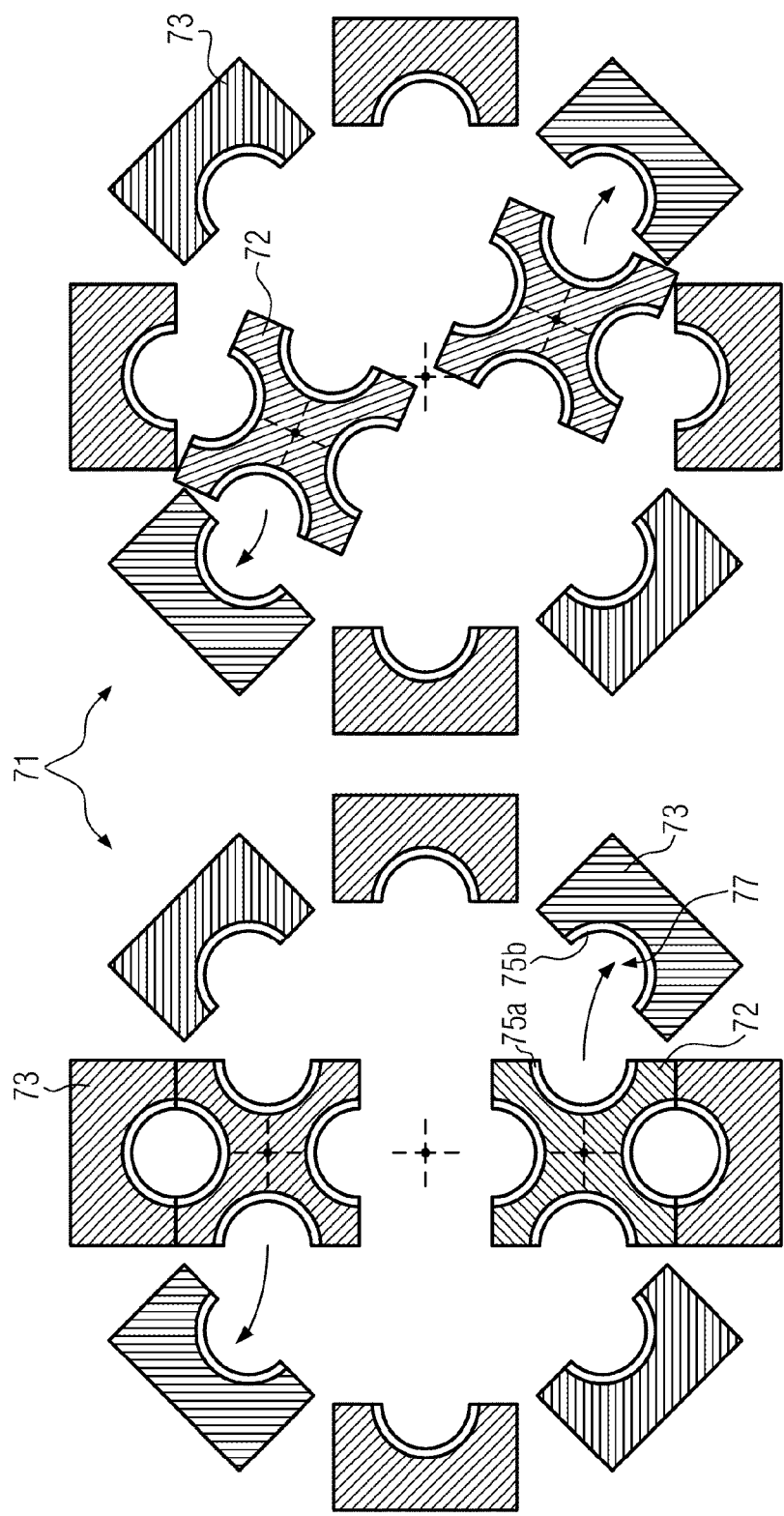
FIG. 8 shows a schematic cross-section through mold carriers of a blow-molding machine of the invention according to an eighth embodiment.

FIG. 8 schematically shows an eighth embodiment 71 of the blow-molding machine according to the present invention in which multi-carriers 72 are provided that can receive, for example, 4 or 3 blow mold halves 75a. As further illustrated by FIG. 8 using the two different positions of the blow-molding machine, the eighth embodiment 71 is based on the principle of a planetary gearing. Accordingly, the multi-carriers 72 are formed as planet gears rotating within a ring gear formed by stationary mold carriers 73 having blow mold halves 75b. The drive of the multi-carriers 72 is effected via a sun gear (not shown). During rotation of the multi-carriers 72, movable blow mold halves 75a and 75b and stationary blow mold halves 75b each come to be disposed oppositely and successively form blow mold cavities 77. The motion phase in between is in turn continuously, so that cavities 77 are closed and opened at the same time. This allows realizing a stationary blow-molding machine having a quasi-continuous mode of operation. Drives and compressed air lines can be provided at the stationary mold carriers 73 with very little equipping effort for the respective blow mold cavities 77. In a variant of this—not shown—two or more blow mold halves 77 of a multi-carrier 72 could simultaneously made to contact two or more stationary mold carriers 73 to form two or more cavities 77. The angle of the parting planes between at least two adjacent blow molds 75a on a multi-carrier 72 would be the same as the angle between the parting planes of two adjacent stationary blow molds 75b.

Figure 9:
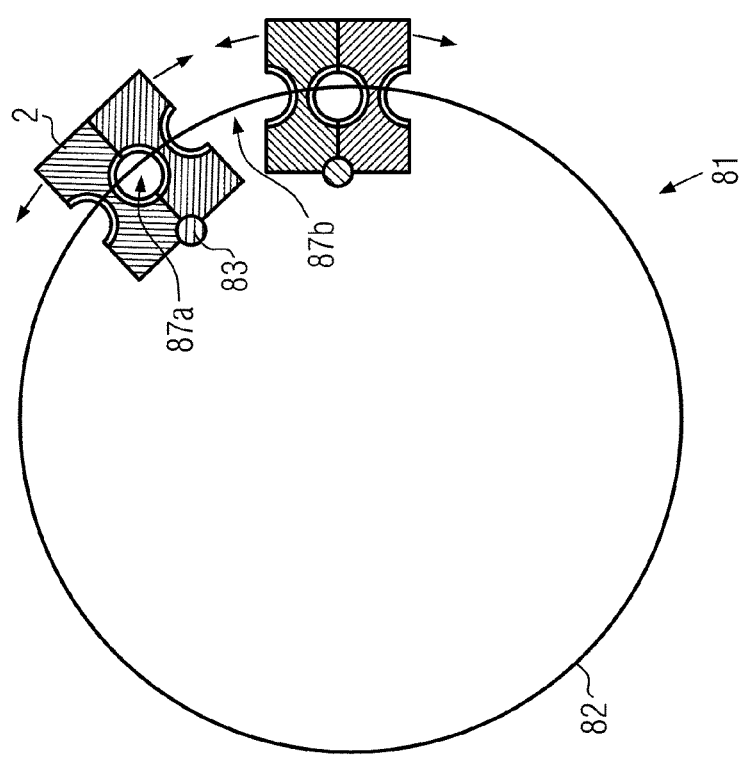
FIG. 9 shows a schematic cross-section through a rotary blow-molding machine of the invention according to a ninth embodiment.

FIG. 9 shows a ninth embodiment 81 of the blow-molding machine according to the present invention being designed as rotary machine. Here, a plurality of identical mold carriers 2 are formed as double carriers and arranged circumferentially evenly on a blowing wheel 82. Furthermore, two adjacent double carriers are each coupled to one another by a common swivel mechanism 83. Double carriers thus coupled to each other together form a first set of blow mold cavities 87a. Furthermore, a second set of blow mold cavities 87b is formed between two adjacent double carriers not coupled to each other by the swivel mechanism 83. By continuously pivoting the mold carrier 2 about the respective swivel mechanisms 83, either the first set of blow mold cavities 87a is closed and the second set of blow mold cavities 87b is opened, or vice versa Simultaneous opening and closing of blow mold cavities 87a, 87b can thereby be effected also in this embodiment 81 by a single continuous motion, in this case by using the swivel mechanism 83. One variant is particularly advantageous in which for every rotation of the blowing wheel 82, there is a change to opening one set of blow mold cavities 87a and closing the other set of blow mold cavities 87b. This means for continuous rotation of the blowing wheel 82 that during every second rotation, containers are blown in the first set of blow mold cavities 87a and fully blow-molded containers are removed from the second set of blowing cavities 87b and new preforms are introduced, and vice versa.

Figure 10:
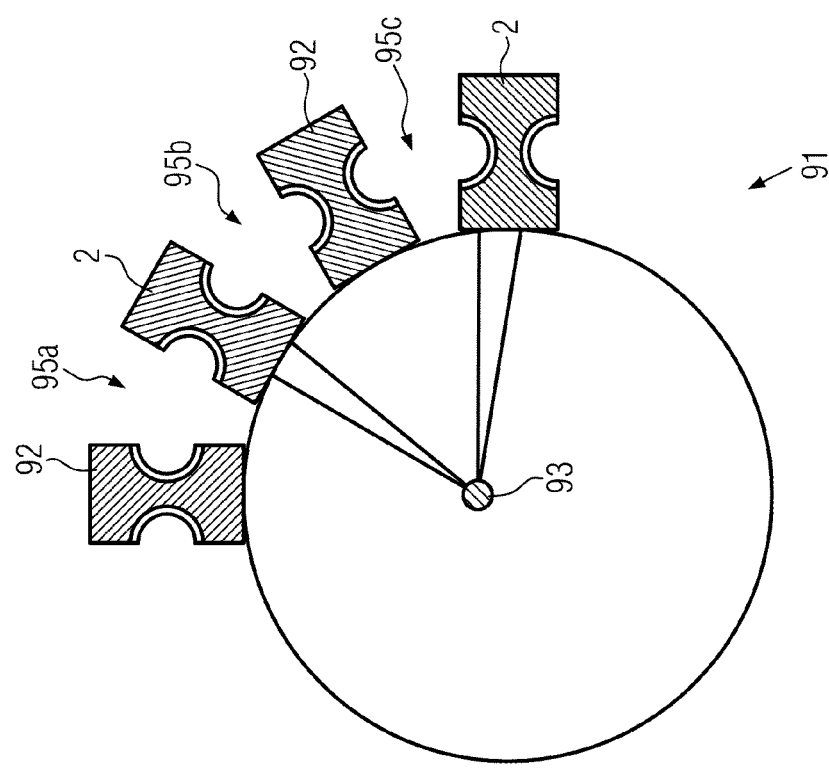
FIG. 10 shows a schematic cross-section through a rotary blow-molding machine of the invention according to a tenth embodiment.

FIG. 10 illustrates a tenth embodiment 91 of the blow-molding machine according to the present disclosure which differs from the ninth embodiment 81 essentially in that circumferentially moving mold carriers 2 and stationary mold carrier 92 alternate. The movable mold carriers 2 are further mounted on a common swivel device 93. Blow mold cavities 95a and 95c can, for example, in a first revolution be jointly closed, while blow mold cavities 95b located therebetween are opened for removing fully blow-molded containers and feeding preforms. In the subsequent revolution, the previously opened blow mold cavities 95b are closed by the swivel device 93, whereas the previously closed blow mold cavities 95a, 95c are opened. Opening and closing blow mold cavities 95a to 95c can also in this case be effected by a continuous pivoting motion of the double carriers with minimal acceleration and deceleration phases.

Figure 11:
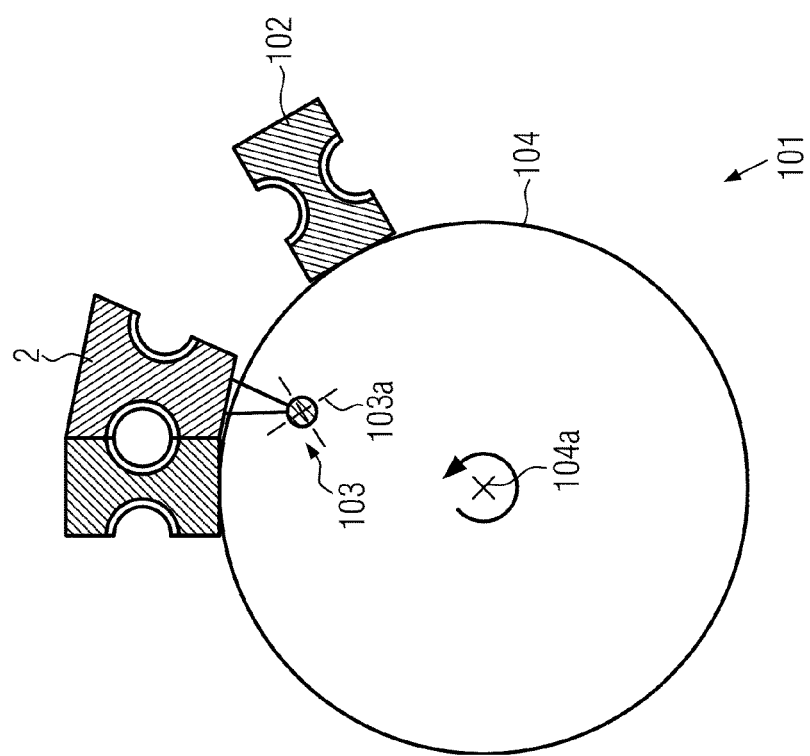
FIG. 11 shows a schematic cross-section through a rotary blow-molding machine of the invention according to an eleventh embodiment.

FIG. 11 shows an eleventh embodiment 101 of the blow-molding machine according to the present disclosure, the mode of operation of which corresponds to that of the tenth embodiment. Also in the eleventh embodiment, movable mold carriers 2 and stationary mold carriers 102 are alternately provided as double carriers. The movable double carriers, however, are each preferably mounted on separate swivel devices 103 preferably in the circumferential edge region of the blowing wheel 104. As further shown in FIG. 11, the movable mold carriers 2 and/or the stationary mold carriers 102 can have a trapezoidal cross-section in order to compensate a radial offset between the axis of rotation 104a of the blowing wheel 104 and the axis of rotation 103a of the swivel device 103. This reduces the force required for actuation of the swivel device 103, for example, with the aid of cam tracks.

Introducing preforms and removing containers according to the embodiments of FIGS. 9, 10 and 11 can be effected by rotational feed and removal stars—not shown—for example, fixedly disposed in the vicinity of the blowing wheel 82, 104 or flexible vehicle systems or other systems suited for transporting containers. In the embodiment with star wheels, several feed as well as removal star are respectively possible distributed on the perimeter of the blowing wheel 82, 104.

In the embodiments of FIGS. 9, 10 and 11, the parting planes in their continuation intersect in particular the axis 104a of the blowing wheel 82, 104.

Figure 12:
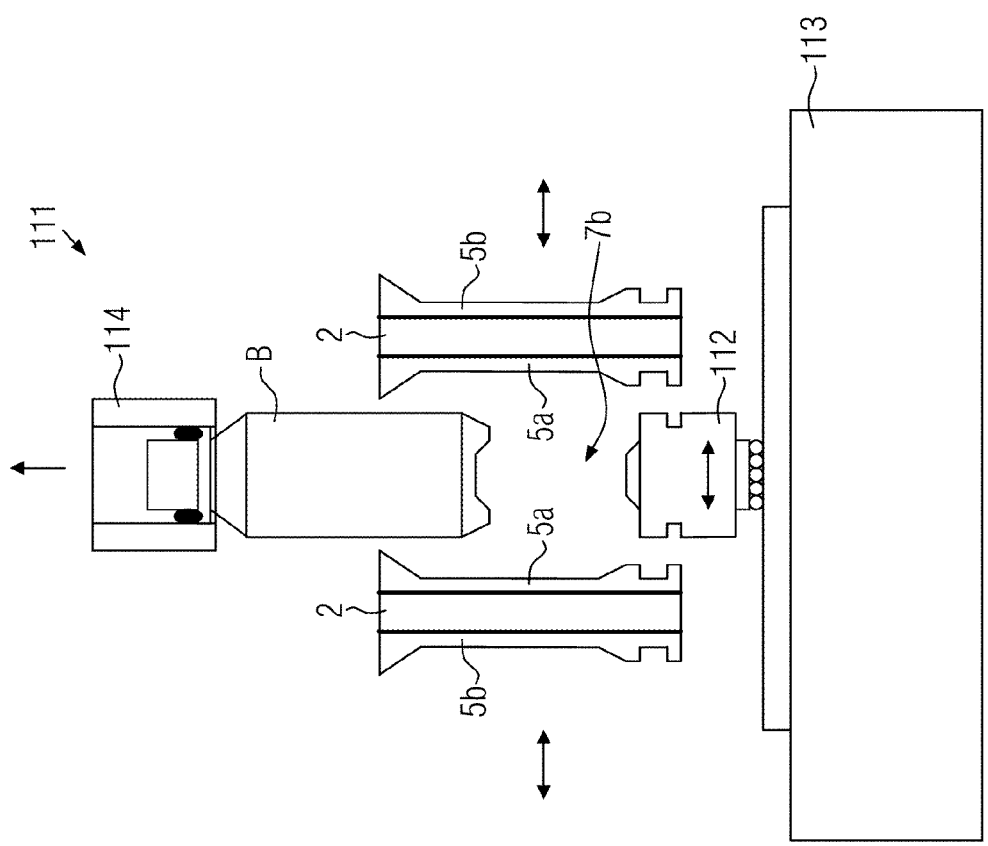
FIG. 12 shows a longitudinal sectional view through a mold carrier according to the invention of a stationary blow-molding machine according to a twelfth embodiment.

FIG. 12 shows a longitudinal sectional view of a twelfth embodiment 111 of a blow-molding machine according to the present disclosure in a stationary embodiment. According thereto, in addition to the movable mold carriers 2, a base mold 112 is provided for each pair of blow mold halves 5a, 5b which is mounted linearly displaceable so that it can be displaced together with the double carriers 2. This, for example, allows realization of the joint motion of adjacent mold carriers 2 when the blow mold cavity 7b is closed, as described in the context of the third embodiment 21. The mold carrier 2 and the base mold 112 are preferably mounted on a stationary machine frame 113. Therefore, the twelfth embodiment is suited for a linear arrangement of adjacent blow mold cavities 7a to 7d, as has been described for the third embodiment. FIG. 12 further indicates a fully blow-molded container B as well as a blowing nozzle 114 which can be raised together with the fully blow-molded container B from the blow mold cavity 7b. The motions are indicated in FIG. 12 by arrows. The base mold 112 can be fixedly connected to the machine frame 113 when no motion of the closed blow mold cavity 7b is required. Here as well, adjacent blow mold cavities are opened and closed simultaneously by continuous motions of the mold carrier 2. For removing the bottle, the base 112 could also be vertically movable (not shown).

Figure 13:
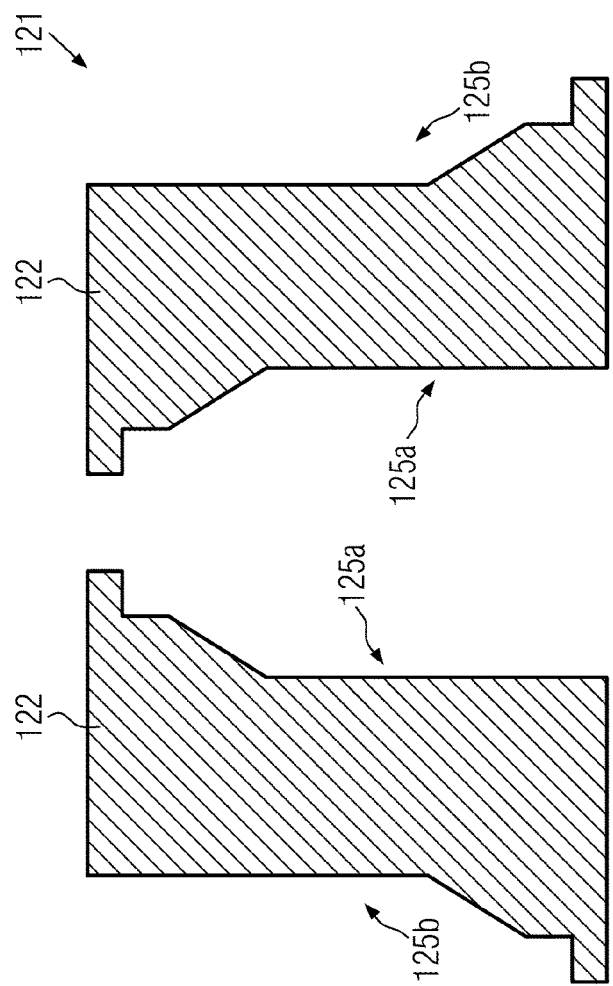
FIG. 13 shows a longitudinal sectional view through mold carriers of the invention according to a thirteenth embodiment.

FIG. 13 shows a thirteenth embodiment 121 of the mold carrier 122 according to the present disclosure in which two blow mold halves 125a, 125b are provided tilted by 180° relative to each other. This means, the blow mold cavities are upside down relative to the respective adjacent one. By combination of associated blow mold halves 125a and 125b, every second container B is therefore blown upside down. Blow mold cavities can thereby be arranged adjacently in a particular space-saving manner In this case, two levels for transferring the preforms and the fully blow-molded containers are provided. This can be achieved, for example, with a transfer star in which the grippers are distributed on two levels. The mold carriers 122 can also be continuously moved according to the invention.

Figure 14:
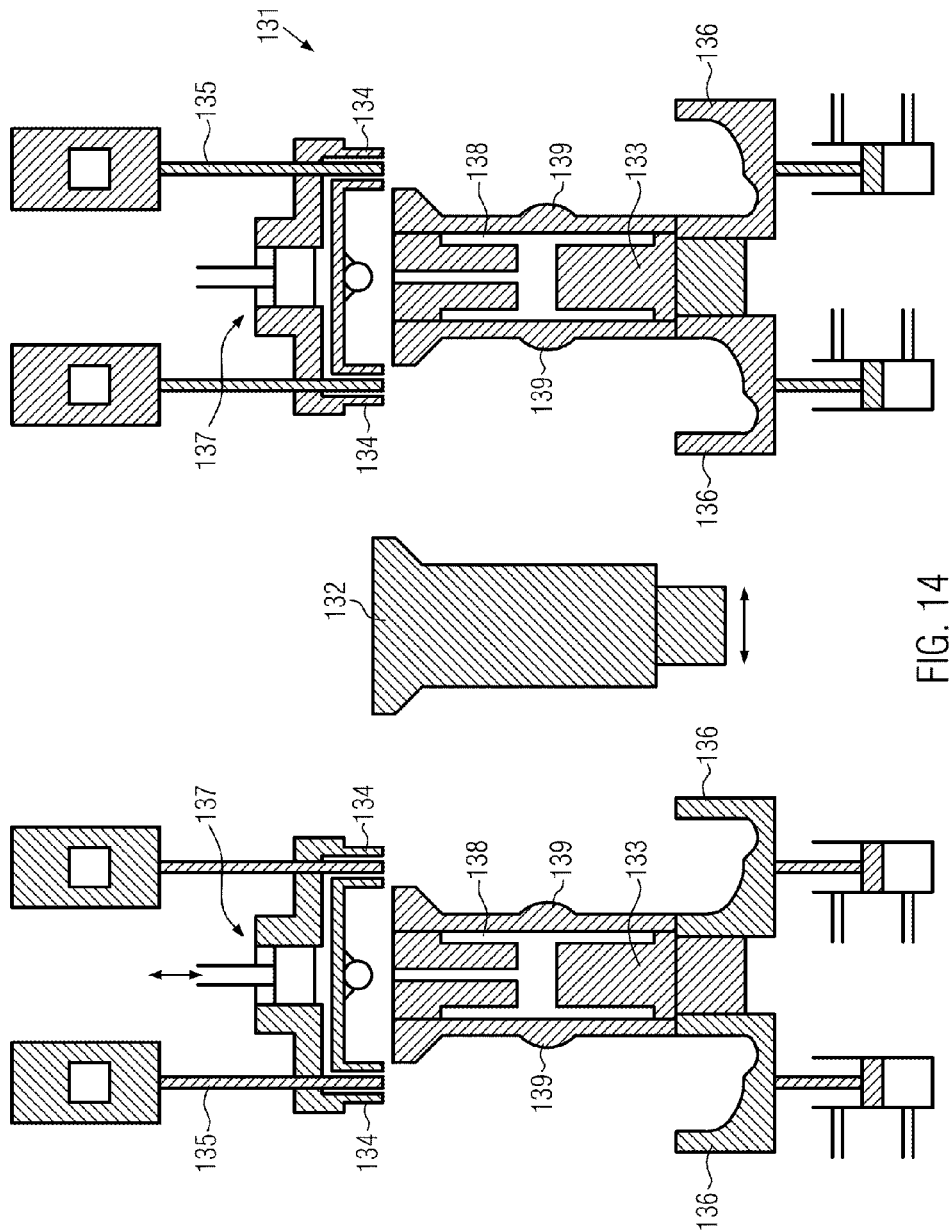
FIG. 14 shows a schematic longitudinal sectional view through mold carriers of the invention with lifting devices for stretching mandrels and base molds according to a fourteenth embodiment.

FIG. 14 shows a fourteenth embodiment of the blow-molding machine 131 according to the present disclosure in which movable mold carriers 132 are provided as a double carriers as well as stationary mold carriers 133 with associated blowing nozzles 134 and stretching rods 135 Furthermore, base molds 136 that can be lowered are provided at the stationary mold carriers 133. The design of the movable double carriers 132 can thereby be especially simplified. Actively operated and/or pressurized components, such as the stretching rods 135 and the blowing nozzles 134, can likewise be mounted in a stationary manner. In this, a simplification would also be conceivable in which the stretching rods 135 and/or the blowing nozzles 134 of a mold carrier 133 are raised and lowered by a common drive. The blowing nozzles 134 can in contrast to the illustrated embodiment also be operated separately. It is presently also possible to separately assign a valve block 137 to a cavity or multiple cavities for providing a plurality of blowing pressures and for relieving air.

Valves for pressure pads 138 between the mold carrier 133 and the blow mold halves 139 can be accommodated either in the valve blocks 137 or disposed directly at the pressure pads 138. Associated seals are not shown for reasons of simplicity. The pressure pads 138, for example, have a larger area than the container to be blown and are subjected to the blow pressure to firmly press the blow mold halves together and to minimize the dividing seam of the container. It is particularly advantageous to have only one pressure pad 138 provided on a mold carrier 133 for two cavities or blow mold halves 139.

Figure 15:
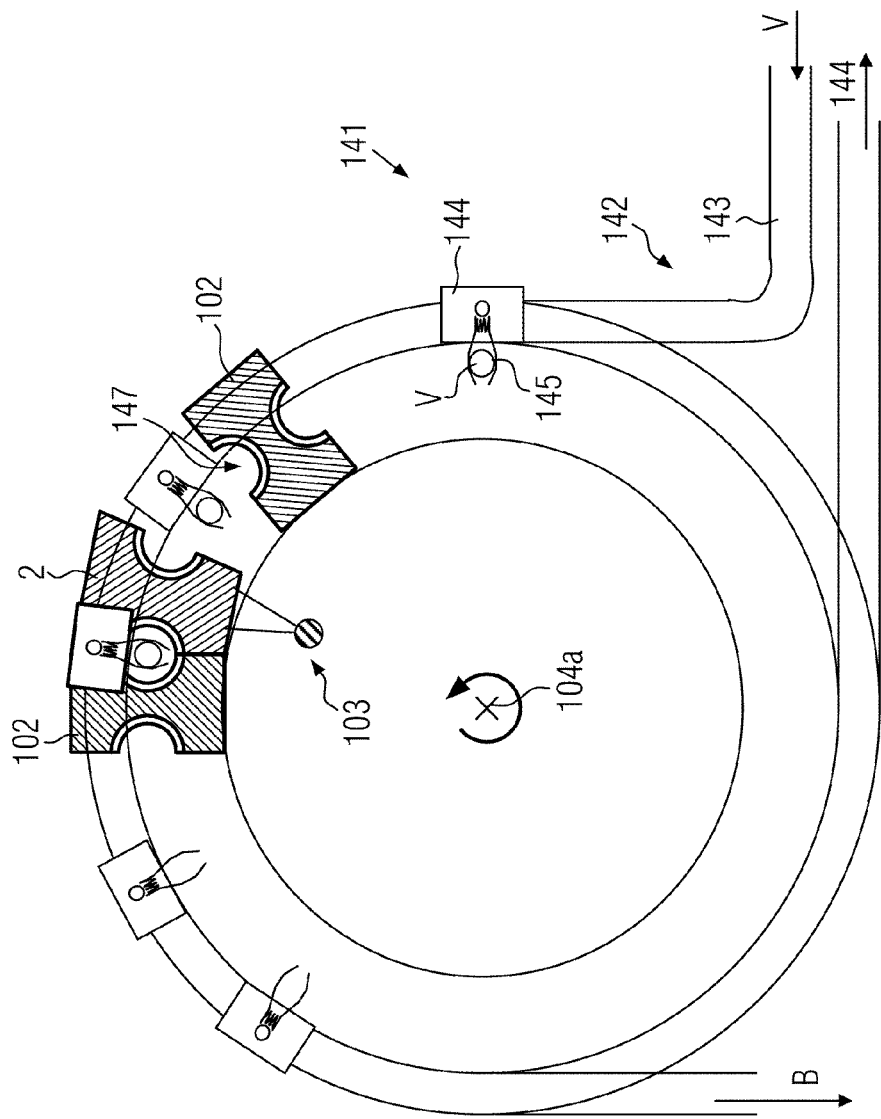
FIG. 15 shows a schematic plan view onto a blow-molding machine according to the invention with a transfer system for preforms and blow-molded containers according to a fifteenth embodiment.

FIG. 15 shows a fifteenth embodiment 141 of the blow-molding machine according to the present disclosure in which the mold carriers 2, 102 and the swivel device 103 of the eleventh embodiment 101 are combined with a transport device 142 for transporting preforms V and fully blow-molded containers B. The transport device 142 according thereto comprises a rail system 143 and individually driven vehicles 144 on which gripper devices 145 are mounted for gripping preforms V and/or blow-molded containers B. The vehicles 144, for example, transport carriages, are preferably driven individually so that they can be driven into the regions of individual blow mold cavities 147 as needed. The rail system 143 preferably runs above the blow mold cavities 147. Preforms V can thereby be introduce in a simple manner from above into the open blow mold cavities. Similarly, the vehicles 144 can for removing fully blow-molded containers B—not shown—be selectively driven to opening cavities 147. Double clamps 145 can also be provided on the vehicles 144, as shall be described in greater detail below, in order to both remove fully blow-molded containers B as well as to introduce preforms into emptied blow mold cavities 147. The transport device 142 could be combined with the other rotary-type blow-molding machines described. The parting planes of the mold carriers 102 and the associated blow molds can presently (not shown) be oriented tangentially to the transport direction of the vehicles 144 thereby facilitating the removal of the containers. Alternatively, also the vehicles 144 can perform respective removal motions with the clamps 145, in that the clamps 145 are pivoted about an axis. Alternatively, the mold carriers can be provided with cam tracks for these motions with which the clamps 145 interact.

Figure 16:
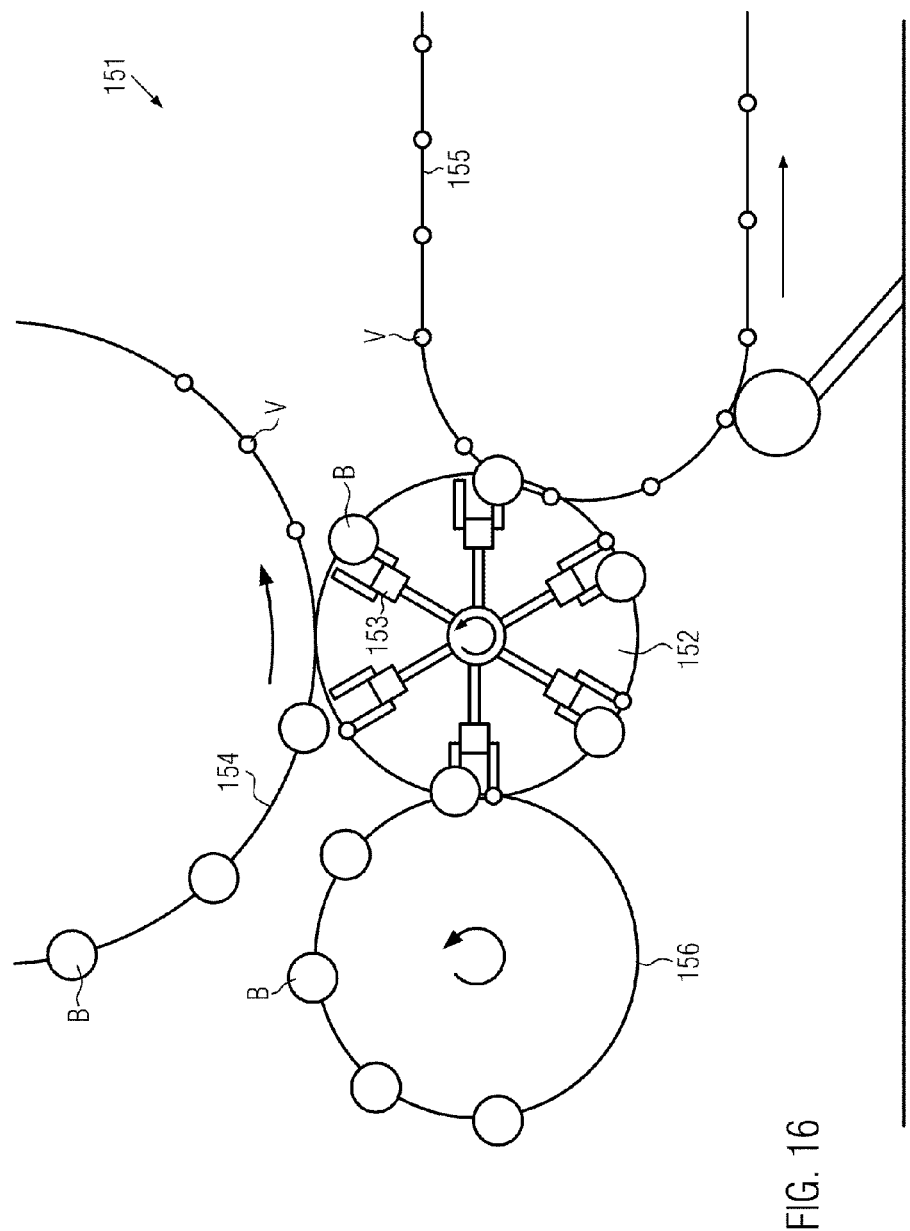
FIG. 16 shows a schematic plan view onto a blow-molding machine according to the invention with a transfer system having double grippers for gripping preforms and blow-molded containers according to a sixteenth embodiment.

FIG. 16 shows a sixteenth embodiment 151 of the blow-molding machine according to the present disclosure, in which a central transfer device 152 in the form of a star wheel having double grippers 153 for transferring the containers B and the preforms V is combined with a blowing wheel 154. In this, mold carriers according to the invention, for example, as described in the ninth to fourteenth embodiment, can be disposed on the blowing wheel 154. This is not shown in FIG. 16 for reasons of simplicity. However, a transport device 155 for feeding and heating preforms V and a further transport device 156 for transporting away the fully blow-molded containers B are indicated. The transport directions are each indicated by arrows.

Figure 17:
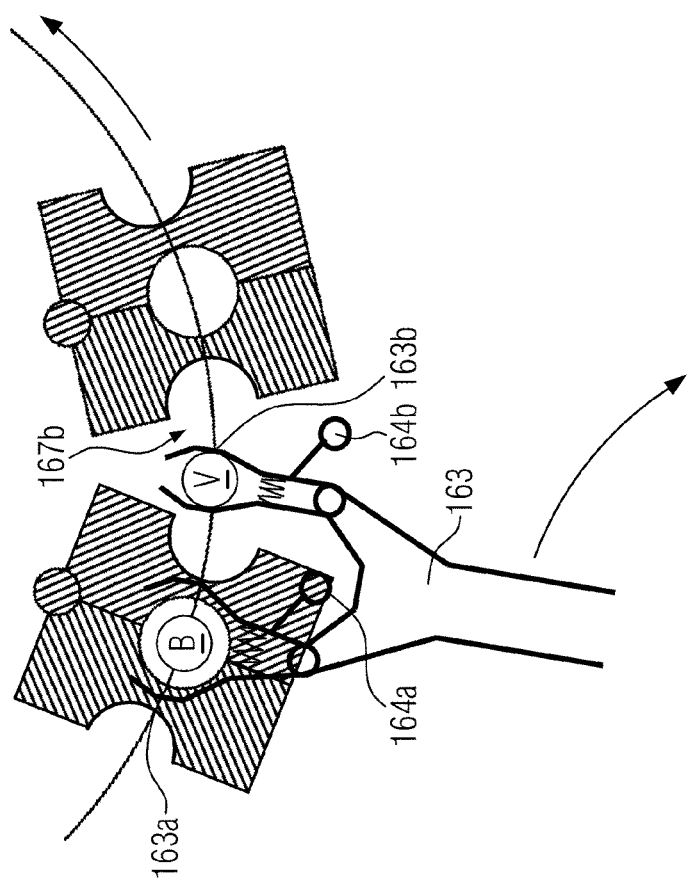
FIG. 17 shows a schematic plan view onto a double gripper with individually actuatable grippers for preforms and containers according to a seventeenth embodiment.

FIG. 17 shows a seventeenth embodiment of the blow-molding machine 161 according to the present disclosure in which double grippers 163 are by way of example combined with the mold carriers 2 of the ninth embodiment 81. A first gripper unit 163a for gripping fully blow-molded containers B and a second gripper unit 163b for gripping preforms V are respectively provided at the double grippers 163. The gripper units 163a, 163b are each individually controllable by guide rollers 164a, 164b or other suitable drives, for example, servo motors. For example, a preform V can be introduced into an open or opening blow mold cavity 167b, while a fully blow-molded container B is removed from an opening or already opened adjacent blow mold cavity.

Figure 18:
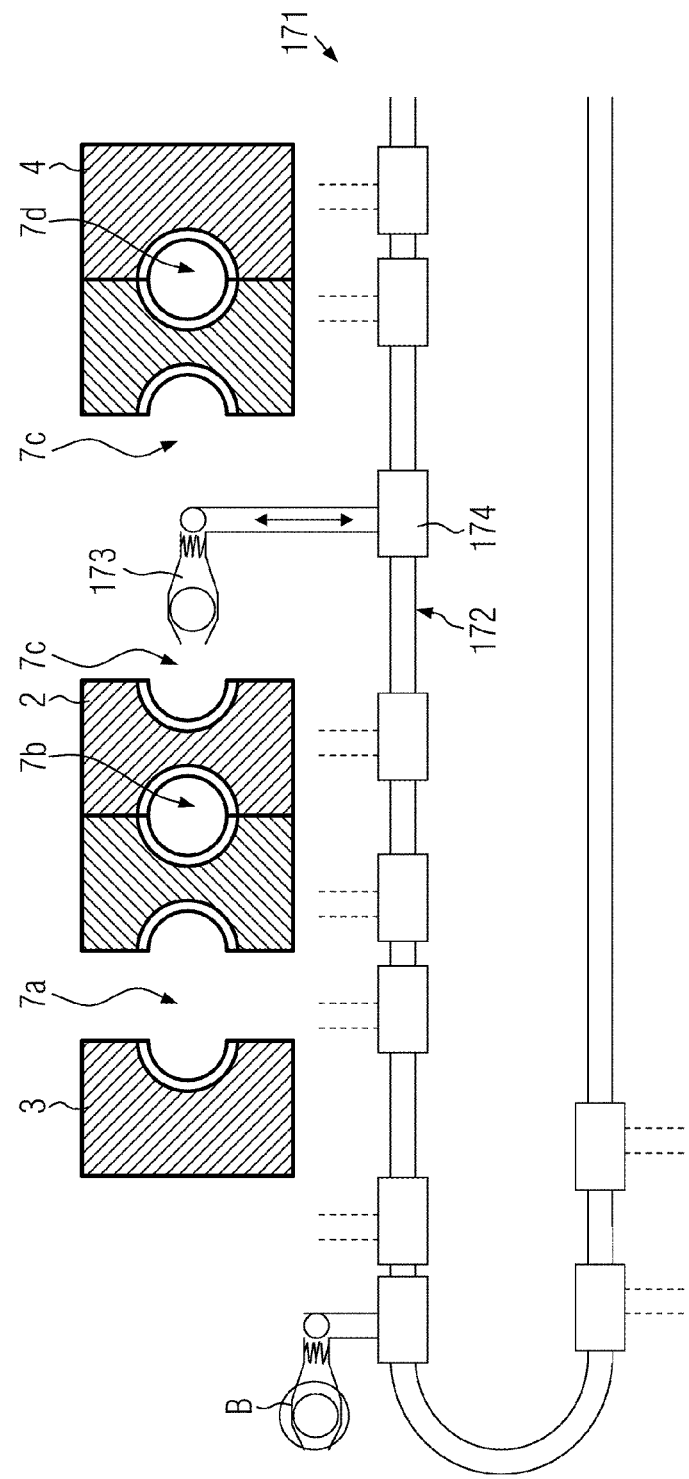
FIG. 18 shows a blow-molding machine according to the invention with a transport system for preforms and blow-molded containers on the basis of individually driven vehicles according to an eighteenth embodiment.

FIG. 18 shows an eighteenth embodiment 171 of the blow-molding machine according to the present disclosure in which the stationary blow-molding machine with continuously linearly movable mold carriers 2 and stationary mold carriers 3, 4, 21 located at the edge according to the third embodiment is combined with a transport device 172 with individually actuatable grippers 173. The grippers 173 are mounted, for example, on individually driven vehicles 174 that can be moved by linear drives along a guide device 175, such as a rail. Preferably, the active drive components, such as linear motor modules, are integrated into the rail system so that the vehicles 174 can be designed as reactive, in particular passive components.

The grippers 173 are preferably telescopically extendable from the vehicle 174. The transport device 172 is preferably flexibly controllable so that positions 174 in the region of the blow mold cavities 7a to 7d can be approached by the vehicles 174 as needed. For example, it can be determined with sensors—not shown—that a container B is fully blown in order to then drive a vehicle 174 in the region of the associated blow mold cavity. After opening the blow mold cavity, the container can be removed with the gripper 173 and be passed on to a suitable transfer device for onward transportation. In the same manner, preforms V can be specifically transferred to non-loaded blow mold cavities 7a to 7d. In addition or in alternative to telescopic mounting of the grippers 173, they can be pivotable. The vehicles 174 can be flexibly adapted to the continuous motions during opening and closing of the blow mold cavities 7a to 7d.

Two separately actuatable grippers 173 for respectively holding a preform V and a fully blow-molded container B can also be provided in one vehicle 174. Preferably, the grippers 173 are then separately extendable and/or pivotable relative to the vehicle 174.

Figure 19:
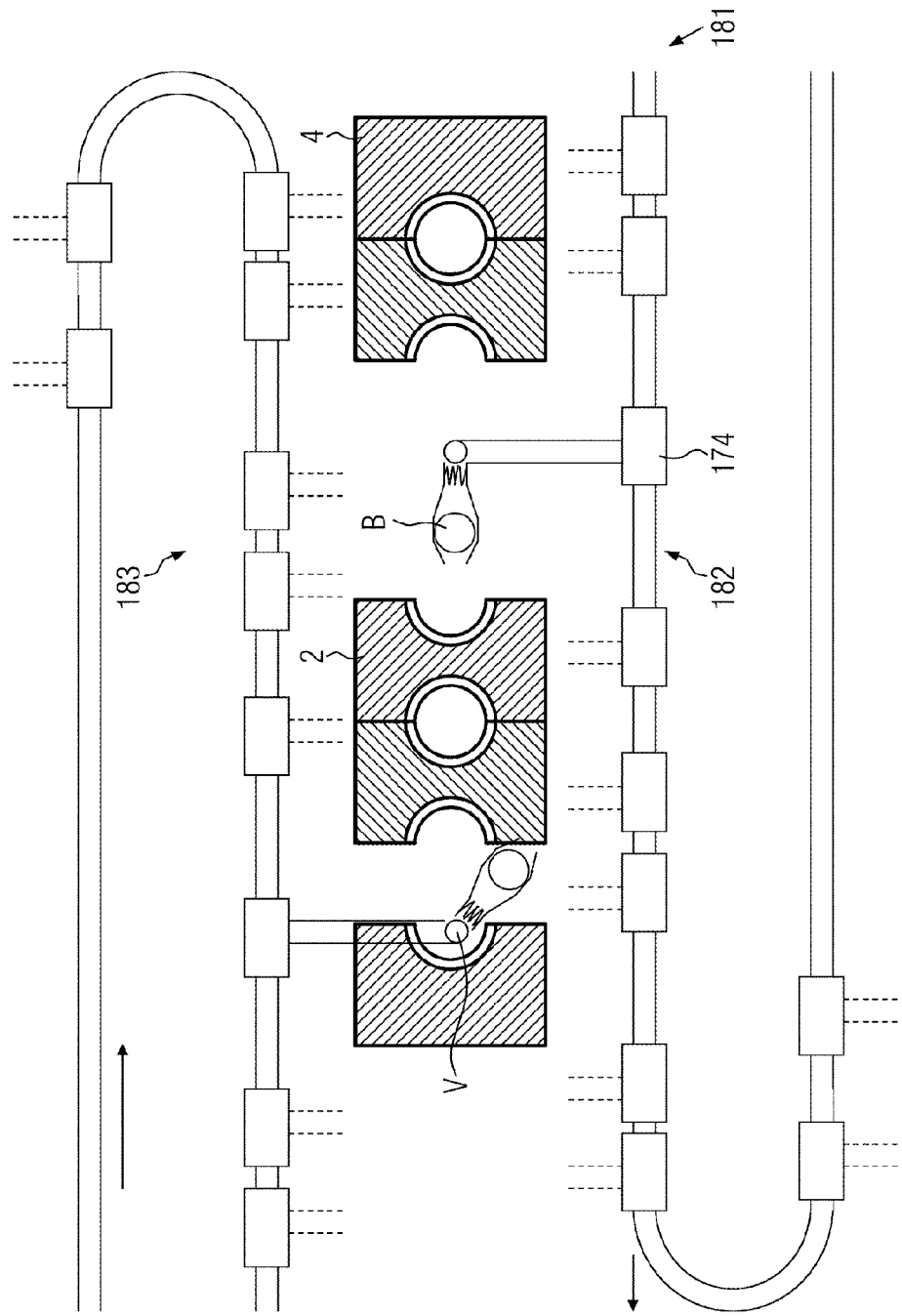
FIG. 19 shows a variant of the transport system according to the invention of FIG. 18 with separate transport paths for the preforms and blow-molded containers according to a nineteenth embodiment.

FIG. 19 shows a nineteenth embodiment 181 of the blow-molding machine according to the present disclosure which differs from the eighteenth embodiment essentially in that two separate transport systems are provided for the preforms V and the fully blow-molded containers B. The preforms V and the container B can thereby be introduced into the blow mold cavities 7a to 7d or removed therefrom in a particularly flexible manner.

Figure 20:
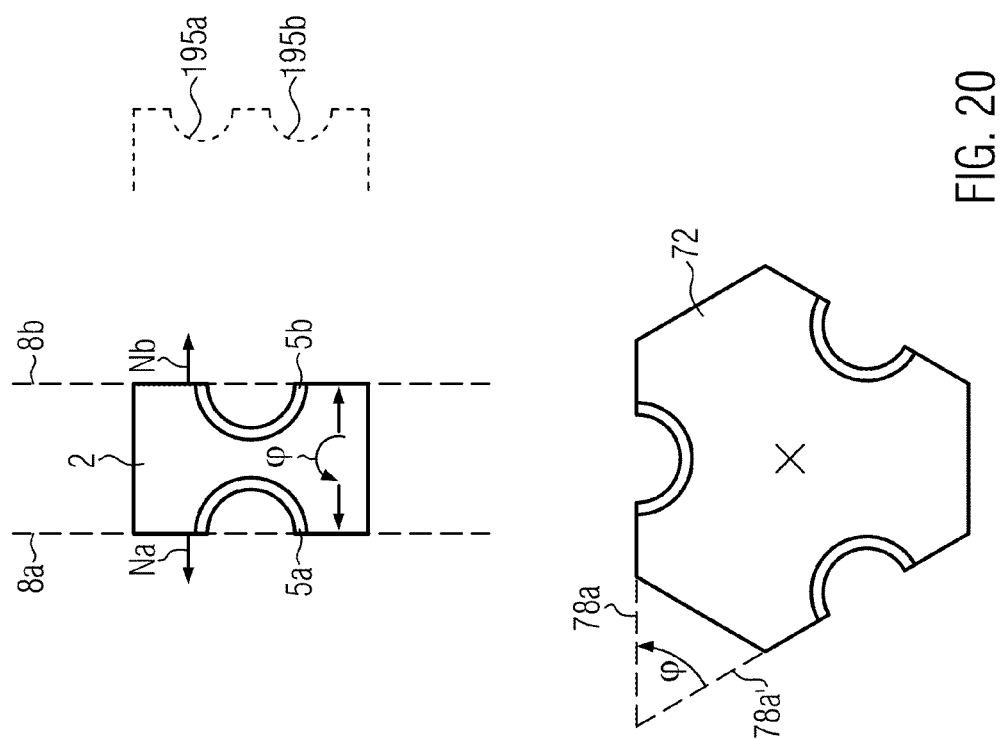
FIG. 20 shows a schematic representation of the positional relationship between the parting planes of a multi-carrier.

FIG. 20 illustrates the position according to the present disclosure of the parting planes 8a, 8b using a common mold carrier 2. According thereto, the parting planes 8a, 8b of a double carrier indicated in FIG. 20 at the top are preferably disposed parallel and such that the associated blow mold halves face away from each other. With an imaginary superimposition of the parting planes 8a, 8b, each viewed in the direction of the arrow, an angle φ of 180° would thereby be formed between them or, expressed differently for double carriers, formed between the normal vectors Na, Nb of the parting planes 8a, 8b. This would logically result in an angle φ of 0° for the blow mold halves 195a, 195b arranged in the same direction indicated in a dashed line.

For the eighth embodiment 71, for example, an angle φ of 60° each would result for triple carriers 72 between adjacent parting planes 78a, 78a'. According thereto, the angle φ can generally for at least three parting planes per multi-carrier be calculated as follows:

$$\varphi=180°*(x-2)/x,$$

where x denotes the number of blow mold halves per multi-carrier.

The embodiments described can be combined in a technically meaningful way. By combining blow mold halves, being associated with different blow mold cavities, on multi-carriers, motions of opening and closing blow mold cavities can be performed simultaneously and continuously and the number of required acceleration and deceleration ramps for opening and/or closing blow mold cavities can be reduced. Process time for blowing containers can thereby be gained. It is with rotary machines in particular possible to effect transfer of the preforms and the fully blow-molded containers using a single transfer star wheel. Particularly advantageous are double grippers which enable demand-related coordination of the transfer motions to the opening, opened and/or closing blow mold cavities in a separately controllable manner.

The present disclosure is not limited to blow-molding machines, but can be used for all machines in which at least two processing elements are infed from different sides to containers or preforms. For example, this is conceivable for so-called "preferential heating", according to which preforms are for the purpose of tempering touched by two plates. The basic principle for this is disclosed in publication DE 102009021792 A1. The motions of the plates can be performed similarly to those of the mold carriers.

What is claimed is:

1. A blow-molding machine for plastic containers with a plurality of mold carriers for carrying blow mold halves, comprising at least two of said mold carriers designed as movable multi-carriers for simultaneously carrying at least two blow mold halves that are associated to different blow mold cavities, said multi-carriers being drivable such that at least one of said blow mold cavities can be opened with a continuous motion of said multi-carriers and simultaneously at least one other of said blow mold cavities can be closed, where at least two multi-carriers are provided that are movable independently from one another.

2. The blow-molding machine according to claim 1, where at least one mold carrier is mounted linearly displaceable to simultaneously close a first set of blow mold cavities and to open a second set of blow mold cavities.

3. The blow-molding machine according to claim 1, where said mold carriers are rotatably mounted to simultaneously close a first set of blow mold cavities and to open a second set of blow mold cavities.

4. The blow-molding machine according to claim 1, where said mold carriers are double carriers for carrying two blow mold halves facing away from each other.

5. The blow-molding machine according to claim 1, where at least one of said mold carriers is stationary.

6. The blow-molding machine according to claim 5, where at least one of a group of a blowing nozzle, a stretching rod, and a pressure pad is provided on said stationary mold carrier.

7. The blow-molding machine according to claim 1, where at least two of the mold carriers can be simultaneously moved into a blowing position in which they together close a blow mold cavity.

8. The blow-molding machine according to claim 1, where said multi-carriers are mounted on individually driven vehicles that are driven in particular using a magnetic force coupling.

9. The blow-molding machine according to claim 1, where at least two multi-carriers are provided the at least two multi-carriers being firmly coupled together and jointly driven.

10. The blow-molding machine according to claim 1, where adjacent blow mold halves are tilted by 180° relative to each other.

11. The blow-molding machine according to claim 1, where said multi-carrier is designed to carry at least three blow mold halves and is rotatably mounted and is a planet gear for closing the different blow mold cavities.

12. The blow-molding machine according to claim 1, further comprising a locking device for locking said multi-carrier to at least one adjacent mold carrier.

13. A blow-molding machine for plastic containers with a plurality of mold carriers for carrying blow mold halves, comprising at least two of said mold carriers designed as movable multi-carriers for simultaneously carrying at least two blow mold halves that are associated to different blow mold cavities, said multi-carriers being drivable such that at least one of said blow mold cavities can be opened with a continuous motion of said multi-carriers and simultaneously at least one other of said blow mold cavities can be closed, and a transfer device on which double grippers for gripping a preform and a blow-molded container are provided.

14. The blow-molding machine according to claim 1, further comprising a transfer device in which grippers for at least one of preforms or blow-molded containers are mounted on individually driven vehicles.

15. The blow-molding machine according to claim 1, where said blow mold halves have mutually corresponding parting planes on which two respective blow mold halves can be guided to one another and parting planes of said same multi-carrier are: one of arranged parallel to each other so that said associated blow mold halves face away from each other; or arranged towards each other under an angle ($\phi$) equal to $180°*(x-2)/x$, where x denotes the number of blow mold halves per multi-carrier.

16. A blow-molding machine for plastic containers with a plurality of mold carriers for carrying blow mold halves, comprising at least two of said mold carriers designed as movable multi-carriers for simultaneously carrying at least two blow mold halves that are associated to different blow mold cavities, said multi-carriers being drivable such that at least one of said blow mold cavities can be opened with a continuous motion of said multi-carriers and simultaneously at least one other of said blow mold cavities can be closed, where said blow mold halves have parting planes corresponding to each other, on each of which two blow mold halves can be guided to one another, and said blow mold halves are each arranged on said multi-carriers in an unchanged position relative to each other, where, parting planes of said same multi-carrier include an angle ($\phi$) with each other unequal to zero.

* * * * *